United States Patent [19]

Ogawa et al.

[11] Patent Number: 5,084,343

[45] Date of Patent: * Jan. 28, 1992

[54] MAGNETIC RECORDING MEDIUM

[75] Inventors: Hiroshi Ogawa; Shinji Saito, both of Kanagawa, Japan

[73] Assignee: Fuji Photo Film Co., Ltd., Kanagawa, Japan

[*] Notice: The portion of the term of this patent subsequent to Jul. 25, 2006 has been disclaimed.

[21] Appl. No.: 341,467

[22] Filed: Apr. 21, 1989

[30] Foreign Application Priority Data

Apr. 21, 1988 [JP] Japan ................. 63-96793

[51] Int. Cl.$^5$ ............................................. G11B 23/00
[52] U.S. Cl. ................................. 428/329; 428/336; 428/694; 428/900
[58] Field of Search ............... 428/694, 900, 336, 329; 427/131

[56] References Cited

U.S. PATENT DOCUMENTS

| | | | |
|---|---|---|---|
| 4,624,883 | 11/1986 | Yamaguchi et al. | 428/694 |
| 4,784,895 | 11/1988 | Mizuno et al. | 428/694 |
| 4,847,147 | 7/1989 | Aonuma et al. | 428/900 |
| 4,851,289 | 7/1989 | Ogawa et al. | 428/694 |
| 4,863,793 | 9/1989 | Ogawa et al. | 428/694 |
| 4,946,374 | 8/1990 | Yamaguchi et al. | 428/694 |
| 4,946,740 | 8/1990 | Ono et al. | 428/900 |

*Primary Examiner*—Paul J. Thibodeau
*Attorney, Agent, or Firm*—Sughrue, Mion, Zinn, Macpeak & Seas

[57] ABSTRACT

A magnetic recording medium is disclosed, comprising a non-magnetic support having thereon plural magnetic layers containing ferromagnetic particles dispersed in a binder including at least one inner magnetic layer and an outer magnetic layer, wherein said ferromagnetic particles present in said outer magnetic layer are Co-FeO$_x$ ($1.33 \leq x \leq 1.5$) having a coercive force of from 800 to 1000 Oe, an average length in the long axis of less than 0.30 $\mu$m as measured transmission by electronmicroscope, and a crystallite size of less than 300 Å as measured by X-ray diffraction, and, the crystallite size and the thickness of the inner magnetic layer are larger than those of said outer magnetic layer.

8 Claims, No Drawings

MAGNETIC RECORDING MEDIUM

FIELD OF THE INVENTION

This invention relates to a magnetic recording medium, and more particularly it relates to a magnetic recording medium comprising plural magnetic layers having improved electromagnetic characteristics and having the property of hardly wearing out a magnetic head.

The magnetic recording medium of this invention can be used as a video tape or an audio tape for use in a home VTR (video tape recorder).

BACKGROUND OF THE INVENTION

A magnetic recording medium comprising a non-magnetic support having thereon a magnetic layer containing ferromagnetic particles uniformly dispersed in a binder is conventionally and widely used as a video tape or an audio tape. Recently, with improvements in the high image quality of home VTR's, improvements in high image quality of a video tape used therein has also been demanded. The resolution of image is limited in the recording and reproducing system wherein the conventional Y signal carrier frequency is from 4.4 to 4.8 MHz. In this connection, it has been proposed to increase the Y signal carrier frequency to such an extent that there is reciprocity with the conventionally known carrier. However, the Y signal carrier can be increased only by 1 MHz, and thus brings about an insufficient improvement of the resolution.

Further, when the Y signal carrier frequency is increased to 6 MHz or more to increase the resolution, a sufficiently high output could not be obtained due to self-demagnetization in the conventional video tape having a coercive force of from 600 to 700 Oe. For the above reason, the above high output can be obtained by adjusting the coercive force of the video tape to 800 to 1000 Oe. But in this case, recorded signals can not sufficiently be erased by a conventional erasure head. And when erasure current is increased with a conventional erasure head to overcome this problem, there is a further problem that the erasure rate is deteriorated due to heat generated from the head.

Unless both an average length in the long axis and a crystallite size of the ferromagnetic particles in the magnetic layer are reduced, noise increases although sensitivity is improved, and as a result, there is also a problem that image quality of the reproduced images is not improved.

SUMMARY OF THE INVENTION

An object of this invention is to provide a magnetic recording medium having improved electromagnetic characteristics and having the property of hardly wearing out a magnetic head for the purpose of solving the conventional problems as above.

To achieve the foregoing and other objects, the present invention provides a magnetic recording medium comprising a non-magnetic support having thereon plural magnetic layers containing ferromagnetic particles dispersed in a binder including at least one inner magnetic layer and an outer magnetic layer, wherein said ferromagnetic particles present in said outer magnetic layer are Co-FeOx ($1.33 \leq x \leq 1.5$) having a coercive force of from 800 to 1000 Oe, an average length in the long axis of less than 0.30 μm as measured transmission by electronmicroscope, and a crystallite size of less than 300 Å as measured by X-ray diffraction, and, the crystallite size and the thickness of the inner magnetic layer are larger than those of said outer magnetic layer.

Further preferably, the ferromagnetic particles present in the inner magnetic layer are FeOx or Co-FeOx ($1.33 \leq x \leq 1.5$) having a coercive force of from 350 to 900 Oe and a crystallite size of 300 Å or more as measured by X-ray diffraction.

More preferably, the thickness of the outer magnetic layer is 2 μm or less, particularly 1 μm or less, and the total thickness of the inner magnetic layer preferably is from 2.0 to 10 μm, and more preferably from 2.5 to 5 μm.

DETAILED DESCRIPTION OF THE INVENTION

The magnetic recording medium of this invention is basically comprised of a non-magnetic support and plural magnetic layers provided thereon. The plural magnetic layers are divided into an outer magnetic layer (i.e., as surface magnetic layer) provided at the uppermost position (that is, furthest from the non-magnetic support) and at least one inner magnetic layer comprised of a single layer or plural layers. The magnetic layers are basically comprised of ferromagnetic particles and binder bonding the ferromagnetic particles in an uniformly dispersed state. The most characteristic feature of this invention resides in the ferromagnetic particles present in the outer magnetic layer and the inner magnetic layers.

In this invention, the ferromagnetic particles present in the outer magnetic layer are Co-FeOx ($1.33 \leq x \leq 1.5$) which has a coercive force of from 800 to 1000 Oe (preferably from 850 to 950 Oe), an average length in the long axis of less than 0.30 μm (preferably 0.25 μm or less) determined by transmission electronmicroscope and a cryatallite size of less than 300 Å (preferably 250 Å or less) as determined by X-ray diffraction.

Ferromagnetic particles having a coercive force of less than 800 Oe are undesirable in the outer magnetic layer, because the output is decreased, and those having a coercive force of more than 1000 Oe are also undesirable in the outer magnetic layer, because the recorded signals can not be erased. Ferromagnetic particles having an average length in the long axis of 0.30 μm or more as measured by a transmission electron microscope and a crystallite size of 300 Å or more in the direction of (1,1,0) as measured by X-ray diffraction are not preferred in the outer magnetic layer, because noise at recording images is high and sufficient C/N (ratio of carrier to noise near the carrier) can not be insured. Particularly when the carrier is 6 MHz or more, unless the average length in the long axis and the crystallite size fall within the above described range for the ferromagnetic particles in the outer magnetic layer, sufficient image quality can not be obtained.

The ferromagnetic particles which are used in the outer magnetic layer (i.e., the surface magnetic layer) are those which have a good balance between output and noise, and particularly are those which are Co-containing FeOx ($1.33 \leq x \leq 1.5$). Specifically, those are Co-containing $\gamma$-Fe$_2$O$_3$, Fe$_3$O$_4$ or an intermediate product therebetween.

Ferromagnetic particles which are used in the inner magnetic layers, that is, in the magnetic layers other than the surface magnetic layer (i.e., the outer magnetic layer) are FeOx or Co-FeOx ($1.33 \leq x \leq 1.5$) having a coercive force of from 350 to 900 Oe, and preferably from 500 to 850 Oe, a crystallite size of 300 Å or more as measured by X-ray diffraction, and an average length in the long axis of preferably 0.10 µm or more (more preferably 0.15 µm or more).

Ferromagnetic particles having a coercive force of less than 350 Oe are not preferred in the inner magnetic layers, because output at the short wave length region decreases, and those having a coercive force of more than 900 Oe are also not preferred in the inner magnetic layer, because output at the long wave length region decreases. Ferromagnetic particles having a crystallite size of 300 Å or more measured by X-ray diffraction are preferred for the inner magnetic layers, since Br (residual magnetic flux density) in the inner magnetic layers is improved.

The ferromagnetic particles employed in the inner magnetic layers are particles having an average particle size of generally from 0.05 to 3.0 µm and preferably from 0.1 to 2.0 µm. One or two different kinds of the above ferromagnetic particles can be used in mixture to prepare a magnetic recording medium of this invention.

The ferromagnetic particles can be uniformly dispersed in a binder to form a coating composition for forming a magnetic layer. The binder used for forming the coating composition which is used to form the magnetic layer can be a thermoplastic resin, a thermosetting resin, a reactive type resin or a mixture thereof which are conventionally known.

Thermoplastic resins which can be used as a binder include resins having a setting temperature of 150° C. or less, an average molecular weight of from 10,000 to 300,000 and a degree of polymerization of from about 50 to 1,000, such as, for example, a copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, a urethane elastomer, a nylon-silicon resin, nitrocellulose-polyamide resins, polyvinyl fluoride, a copolymer of vinylidene chloride and acrylonitrile, a copolymer of butadiene and acrylonitrile, a polyamide resin, a polyvinyl butyral, cellulose derivatives (e.g., cellulose acetic butyrate, cellulose diacetate, cellulose triacetate, cellulose butyrate, nitrocellulose), a copolymer of styrene and butadiene, a polyester resin, a copolymer of chlorovinyl ether and acrylic acid ester, an amino resin, various synthetic rubber thermoplastic resins or a mixture of two or more of any of the above resins.

Thermosetting or reactive type resins which can be used as a binder include resins having a molecular weight of 200,000 or less when they are in the coating composition. When the coating composition for forming a magnetic layer is coated, dried and then heated, these resins react and the molecular weight thereof becomes infinite due to such reactions as a condensation reaction, an adduct reaction and the like. Among these resins, resins that do not soften nor melt until they are heat-decomposed are desirable. Specifically, the resins include phenolic resins, epoxy resins, hardenable polyurethane resins, urea resins, melamine resins, alkyd resins, silicon resins, reactive acrylic resins, epoxy polyamide resins, nitrocellulose melamine resins, a mixture of high molecular weight polyester resins and isocyanate prepolymer, a mixture of a copolymer of methacrylate and a diisocyanate prepolymer, a mixture of a polyester polyol and a polyisocyanate, a urea and formaldehyde resin, a mixture of a low molecular weight glycol/a high molecular weight diol/triphenylmethane triisocyanate, polyamine resins, or a mixture of two or more of an of the above resins.

One or two or more of the above resins can be used as a binder for forming a magnetic layer, and those mixture having a glass transition temperature Tg of 40° C. or more, and preferably 60° C. or more are preferred.

A coating composition for forming a magnetic layer can be prepared by dissolving the selected binder in a solvent, adding the selected ferromagnetic particles into the resulting solution, mixing, stirring and dispersing uniformly to prepare a dispersion.

Solvents which can be used for forming a binder solution include ketone solvents such as acetone, methyl ethyl ketone, methyl isobutyl ketone, cyclohexanone, isophorone or tetrahydrofuran; alcohol solvents such as methanol, ethanol, propanol, butanol, isobutyl alcohol, isopropyl alcohol or methyl hexanol; ester solvents such as methyl acetate, ethyl acetate, butyl acetate, isobutyl acetate, isopropyl acetate, ethyl lactate, glycol acetate or monoethyl ether; glycol ether solvents such as ether, glycol dimethyl ether, glycol monomethyl ether or dioxane; aromatic hydrocarbon solvents such as benzene, toluene, xylene, cresol, chlorobenzene or styrene; chlorinated hydrocarbon solvents such as methylene chloride, ethylene chloride, carbon tetrachloride, chloroform, ethylene chlorohydrin or dichlorobenzene; N,N-dimethyl formamide; and hexane.

In addition to the above, additives such as dispersing agents or lubricating agents can be added to the coating composition.

Dispersing agents which can be used include fatty acids having from 10 to 22 carbon atoms such as capric acid, caproic acid, lauric acid, myristic acid, palmitic acid, stearic acid, oleic acid, elaidic acid, linolic aicd, linolenic acid or stearolic acid; alkali metals or alkali earth metals of these fatty acids; soaps of metals such as copper or lead and these fatty acids; lecithin; higher alcohols having 10 or more carbon atoms; and sulfuric acid esters and phosphoric acid esters thereof. The dispersing agents are added in an amount of preferably from 0.05 to 20 parts by weight and more preferably from 0.1 to 10 parts by weight, per 100 parts by weight of the binder. Lubricating agents which can be used include silicon oil, graphite, molybdenum disulfide, boron nitride, boron graphite, fluorinated graphite, fluorinated alcohol, polyolefin, polyglycol, alkyl phosphoric acid ester, polyphenyl ether, tungsten disulfide, a higher fatty acid ester, a higher fatty acid amide and higher aliphatic alcohols. Further, antioxidizing agents, such as alkylphenol which is added as an additive for the lubricating oil, rust-preventing agents such as naphthenic acid, oiling agents such as lauryl alcohol, extreme-pressure lubricating agents such as dibenzylsulfide, detergent dispersing agents, viscosity index improvers, pour point depressants and defoaming agents may be added to the coating composition. The lubricating agents are added in an amount of preferably from 0.05 to 20 parts by weight and more preferably from 0.1 to 10 parts by weight, per 100 parts by weight of the binder. Antistatic agents which can be used include electroconductive particles such as graphite, carbon black or carbon black graft polymer, natural surface active agents such as saponin, various nonionic surface active agents, various anionic surface active agents, variuos cationic surface active agents and various amphoteric surface active agents. The antistatic agents can be used alone or in combination. The antistatic agents can be used for their own purpose, and for improving dispersibility, magnetic characteristics, lubricating property and coating property.

The dispersing method is not particularly limited and the order of adding each component is optionally determined. Suitable devices for use in the dispersing treatment include a two-rod roll mill, a three-rod roll mill, a ball mill, a pebble mill, a trommer, a sand grinder, an attritor, a high speed impeller, a dispersing machine, a high speed stone mill, a high speed impact mill, a disper, a kneader, a high speed mixer, a ribbon blender, a co-kneader, an intensive mixer, a tumbler, a blender, a disperser, a homogenizer and an ultrasonic dispersing device, which can be optionally selected in this invention.

The dispersed coating composition for forming the magnetic layer can be coated on a support by various coating methods such as an air doctor coating, a blade coating, an air knife coating, a squeeze coating, an impregnating coating, a reverse roll coating, a transfer roll coating, a gravure coating, a kiss coating, a cast coating or a spray coating. In this invention, a "wet-on-wet coating method" is preferred to prepare the magnetic recording composition of the present invention, and includes "a subsequent coating method" where a coating composition for forming inner magnetic layers is coated on a support and then the coating composition for forming the surface magnetic layer (i.e., the outer magnetic layer) is coated thereon while the composition for the inner magnetic layers is wet, and "a simultaneous coating method" in which there is a simultaneously multicoating method where both coating compositions are simultaneously coated by an extruding coating method. The above "wet-on-wet coating method" is described in JP-A-62-124631 and JP-A-62-212933 (The term "JP-A" as used herein means an "unexamined published Japanese Patent application").

Regarding the coating amount, the coating composition can be coated so that the surface magnetic layer (i.e., the outer magnetic layer) has a dry thickness of preferably 2 $\mu$m or less and more preferably 1 $\mu$m or less. When the thickness of the surface magnetic layer exceeds the above range, the improvement of electromagnetic characteristics is reduced. When the dry thickness of the surface magnetic layer is less than about 0.1 $\mu$m, it is extremely difficult to coat such a thin layer, and the effect of the multiple magnetic layers is undesirably reduced.

The total dry thickness of the inner magnetic layers is preferably from 2.0 to 10 $\mu$m and more preferably from 2.5 to 5 $\mu$m. If the thickness is less than the above range, the effect of providing the inner magnetic layers is reduced and the surface smoothness of the outer magnetic layer undesirably deteriorates when the outer magnetic layer is provided on the inner magnetic layer. If the thickness exceeds the above range, the inner magnetic layers are too thick. Therefore, the adhesion between the inner magnetic layers and the support undesirably deteriorates and the improvement of characteristics is reduced.

The support which is to be used for the magnetic layers can be made from materials which are conventionally used as a support and include films of plastics, such as polyester (e.g., polyethylene terephthalate, polyethylene naphthalate), polyolefins (e.g., polypropylene), cellulose derivatives (e.g., cellulose triacetate or cellulose diacetate), vinyl resins (e.g., polyvinyl chloride), polycarbonate, polyamide resins or polysulfon; metal materials such as aluminum or copper; and ceramics such as glass. These supports may be subjected to pre-treatment such as corona-discharge treatment, plasma treatment, undercoating treatment, heating treatment, metal vapour deposition treatment or alkaline treatment. The supports can have various desired shapes.

The magnetic layers thus provided on the support by various methods preferably are provided with magnetic orientation to orientate the ferromagnetic particles while they are being dried, and then the magnetic layers are dried. The techniques for coating, drying and providing magnetic orientation of magnetic layers are conventional ones, and can be used optionally in this invention. A backing layer may be provided on the surface of the support which is opposite to the support surface which contains the magnetic layers. The support provided with the magnetic layers can then be cut to a desired shape to prepare a desired magnetic recording medium.

This invention will be illustrated in more detail by the following Examples and Comparative Examples.

EXAMPLES AND COMPARATIVE EXAMPLES

Coating compositions for forming inner magnetic layers and the outer magnetic layer (i.e., the surface magnetic layer) were prepared in the following manner and then were coated on a polyethylene terephthalate film having a thickness of 14 $\mu$m by a wet-on-wet method, and provided with magnetic orientation while the compositions were undried. The compositions they were dried by passing through the atmosphere at 100° C. for 1 minute to form magnetic layers having thicknesses as shown in Table 1.

Formulation of Coating Composition A for Forming an Surface Magnetic Layer (parts by weight)

| | |
|---|---|
| Co-$\gamma$-FeOx (x = 1.45, Coercive force: 850 Oe, Average length in the long axis: 0.25 $\mu$m, Crystallite size: 240 Å) | 100 parts |
| Copolymer of vinyl chloride and vinyl acetate (Amount of sulfonic acid group: 0.20 wt %, Degree of polymerization: 400) | 15 parts |
| Polyester polyurethane (Amount of sulfonic acid group: 0.10 wt %) | 5 parts |
| Polyisocyanate ("Collonate L-75" manufactured by Nippon Polyurethane Co., Ltd.) | 6.7 parts |
| Myristic acid (Industrial grade) | 2 parts |
| Butyl stearate (Industrial grade) | 1 part |
| Electroconductive carbon (Particle diameter: 10 m$\mu$ (nanometer: nm)) | 1 part |
| $\alpha$-alumina (particle diameter: 0.2 $\mu$m) | 3 parts |
| Methyl ethyl ketone/cyclohexanone (Mixing ratio by volume: 7/3) | 250 parts |

Formulation of Coating Composition B for Forming an Surface Magnetic Layer

The same coating composition as Coating Composition A was prepared except that ferromagnetic particles of Co-$\gamma$-FeOx (x=1.45, Coercive force: 950 Oe, Average length in the long axis: 0.20 μm, Crystallite size: 200 Å) were used to form Coating Composition B.

Formulation of Coating Composition C for Forming Inner Magnetic Layers

| | |
|---|---|
| γ-Fe$_2$O$_3$ *particles* | 100 parts |
| (Coercive force: 350 Oe, | |
| Average length in the long axis: 0.40 μm, | |
| Crystallite size: 400 Å) | |
| Copolymer of vinyl chloride and vinyl acetate | 20 parts |
| (Amount of sulfonic acid group: 0.20 wt %, | |
| Degree of polymerization: 400) | |
| Polyester polyurethane | 5 parts |
| (Amount of sulfonic acid group 0.10 wt %) | |
| Myristic acid (Industrial grade) | 2 parts |
| Butyl stearate (Industrial grade) | 1 part |
| Electroconductive carbon | |
| (Particle diameter: 10 mμ (nanometer: nm)) | 2 parts |
| α-alumina (particle diameter: 0.2 μm) | 3 parts |
| Methyl ethyl ketone/cyclohexane | 250 parts |
| (Mixing ratio by volume: 7/3) | |

Formulation of Coating Composition D for Forming Inner Magnetic Layers

| | |
|---|---|
| Co-γ-FeO$_x$ | 100 parts |
| (x = 1.45, | |
| Coercive force: 650 Oe, | |
| Average length in the long axis: 0.40 μm, | |
| Crystallite size: 350 Å) | |
| Copolymer of vinyl chloride and | 15 parts |
| vinyl acetate | |
| (Amount of sulfonic acid group: 0.20 wt %, | |
| Degree of polymerization: 400) | |
| Polyester polyurethane | 5 parts |
| (Amount of sulfonic acid group 0.10 wt %) | |
| Polyisocyanate ("Collonate L-75", | 6.7 parts |
| manufactured by Nippon Polyurethane Co., Ltd.) | |
| Myristic acid (Industrial grade) | 2 parts |
| Butyl stearate (Industrial grade) | 1 part |
| Electroconductive carbon | |
| (Particle diameter: 10 mμ (nanometer: nm)) | 2 parts |
| Methyl ethyl ketone/cyclohexanone | 250 parts |
| (Mixing ratio by volume: 7/3) | |

Each sample was coated with the magnetic layers as shown in Table 1, provided with calendering treatment, provided with bulkthermo-treatment at 50° C. for 24 hours, and then cut to a tape shape having a width of ½ inch to prepare a video tape.

The thus obtained sample tapes were evaluated in the following manner and the results are shown in Table 1.

Measurement of Video Sensitivity VS

The video sensitivity is shown in terms of a relative value with respect to Comparative Sample No. 5 which was assigned a value of 0 dB using an amorphous head at an output of 8 MHz.

Measurement of carrier noise C/N

The carrier noise is the ratio of the output at 8 mHz and noise at 8±0.1 MHz, and is shown relatively to Comparative Sample No. 5 which was assigned a value of 0 dB.

Measurement of erasure rate

Each sample video tape was mounted on a VTR and signals at 1 KHz were recorded. When those recorded signals were erased, the erasure rate (dB) was measured.

Measurement of still life

Each sample video tape was mounted on a VTR and operated on a still mode. The time (minutes) of the S/N of the images to decrease 6 dB was measured.

Measurement of the wear-out amount of a magnetic head

The wear-out amount (μm) of the magnetic head of the VTR was measured when the sample video tape was mounted on a VTR and run for 100 hours.

The above described "wet-on-wet" coating method includes "subsequent coating method" wherein a first layer is coated and while it is wet, immediately thereafter a second layer is coated, and "simultaneously coating method" wherein two layers are simultaneously coated by an extruding coating method. The coating method used in Examples and Comparative Examples described above was the simultaneously coating method.

TABLE 1

| | (1) Surface magnetic layer | | (2) Inner magnetic layer | | Results of measurements | | | | |
|---|---|---|---|---|---|---|---|---|---|
| Sample No. | Coating composition | Thickness (μm) | Coating composition | Thickness (μm) | VS (dB) | C/N (dB) | Erasure rate (dB) | Still life (min.) | Wear-out of magnetic head (μm) |
| Example | | | | | | | | | |
| 1 (Invention) | A | 0.5 | C | 3.5 | 3.4 | 3.8 | 66 | 120 | 4 |
| 2 (Invention) | A | 1.0 | C | 3.0 | 3.1 | 3.4 | 60 | 120 | 4 |
| 3 (Invention) | A | 2.0 | C | 2.0 | 2.8 | 3.0 | 54 | 120 | 4 |
| 4 (Invention) | A | 1.0 | D | 3.0 | 3.0 | 3.3 | 62 | 120 | 4 |
| 5 (Invention) | B | 1.0 | C | 3.0 | 4.0 | 4.2 | 58 | 120 | 3 |
| 6 (Invention) | B | 1.0 | D | 3.0 | 3.8 | 4.1 | 60 | 120 | 3 |
| Comparative Example | | | | | | | | | |
| 1 (Comparison) | A | 3.0 | C | 1.0 | 2.5 | 2.7 | 50 | 120 | 4 |
| 2 (Comparison) | A | 4.0 | — | — | 2.3 | 2.6 | 48 | 120 | 5 |
| 3 (Comparison) | B | 4.0 | — | — | 3.3 | 3.5 | 46 | 120 | 4 |
| 4 (Comparison) | — | — | C | 4.0 | −5.4 | −5.8 | 76 | 5 | 16 |

TABLE 1-continued

| Sample No. | (1) Surface magnetic layer | | (2) Inner magnetic layer | | Results of measurements | | | | |
|---|---|---|---|---|---|---|---|---|---|
| | Coating composition | Thickness (μm) | Coating composition | Thickness (μm) | VS (dB) | C/N (dB) | Erasure rate (dB) | Still life (min.) | Wear-out of magnetic head (μm) |
| 5 (Comparison) | — | — | D | 4.0 | 0.0 | 0.0 | 72 | 120 | 10 |

As is apparent from the results shown in Table 1, Samples Nos. 1 to 6 (Example 1 to 6) prepared in accordance with the present invention exhibit good results for video sensitivity, electromagnetic characteristics and erasure rate and particularly excellent electromagnetic characteristics. On the other hand, Comparative Sample 1 prepared in Comparative Example 1 exhibits comparatively inferior video sensitivity, electromagnetic characteristics and erasure rate as compared with this invention. Sample Nos. 4 to 6 prepared in accordance with this invention exhibit excellent magnetic characteristics, even though the ferromagnetic particles had different coercive forces and even though different binders were used in the surface (i.e., outer) and inner magnetic layers.

In Comparative Sample Nos. 2 to 5, one or more of the various characteristics, such as, video sensitivity, electromagnetic characteristics or reduced wear-out of the magnetic head is poor, and it was concluded that the characteristics of the magnetic recording medium are not well balanced.

As is clearly seen from the results of the measurements, the magnetic recording layers of the magnetic recording medium prepared by the method of this invention have excellent video sensitivity, electromagnetic characteristics and erasure rate as compared with those of the conventional magnetic recording medium, and therefore, the magnetic recording medium of this invention is extremely useful.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon plural magnetic layers containing ferromagnetic particles dispersed in a binder including at least one inner magnetic layer and an outer magnetic layer, wherein said ferromagnetic particles present in said outer magnetic layer are Co-FeOx ($1.33 \leq x \leq 1.5$) having a coercive force of from 800 to 1000 Oe, an average length in the long axis of less than 0.30 μm as measured transmission by electronmicroscope, and a crystallite size of less than 300 Å as measured by X-ray diffraction, and the crystallite size and the thickness of the inner magnetic layer are larger than those of said outer magnetic layer.

2. The magnetic recording medium as claimed in claim 1, wherein said ferromagnetic particles present in said inner magnetic layer are FeOx or Co-FeOx ($1.33 \leq x \leq 1.5$) having a coercive force of from 350 to 900 Oe and a crystallite size of 300 Å or more as measured by X-ray diffraction.

3. The magnetic recording medium as claimed in claim 1, wherein the thickness of said outer magnetic layer is 2 μm or less.

4. The magnetic recording medium a claimed in claim 1, wherein the thickness of said inner magnetic layer is from 2.0 to 10 μm.

5. The magnetic recording medium as claimed in claim 1, wherein said coercive force of said magnetic particles in said inner magnetic layer is from 500 to 850 Oe.

6. The magnetic recording medium as claimed in claim 1, wherein the thickness of said outer magnetic layer is 1 μm or less.

7. The magnetic recording medium as claimed in claim 2, wherein said ferromagnetic particles present in said inner magnetic layer are Co-FeOx ($1.33 \leq x \leq 1.5$).

8. The magnetic recording medium as claimed in claim 1, wherein the total thickness of said inner magnetic layer is from 2.5 to 5 μm.

* * * * *